July 1, 1969

I. H. BULLOCK 3,452,735

INDEXABLE DRESSING TOOL

Filed June 14, 1967

INVENTOR.
IAN H. BULLOCK
BY
*Farley, Forster & Farley*
ATTORNEYS

United States Patent Office 3,452,735
Patented July 1, 1969

3,452,735
INDEXABLE DRESSING TOOL
Ian H. Bullock, Southfield, Mich., assignor to Koebel Diamond Tool Co., a corporation of Michigan
Filed June 14, 1967, Ser. No. 646,048
Int. Cl. B28d 5/02
U.S. Cl. 125—39                              8 Claims

ABSTRACT OF THE DISCLOSURE

An improved construction for a dressing tool, of the type having a shank and a cutting element holder rotatably mounted thereon so that wear on the cutting element may be equalized by rotating or indexing the holder, in which the holder is rigidly secured for frictionally resisted rotary movement on a stub shaft at one end of the tool shank, the holder having a recess in which a cutting element carrying member is removably mounted. Preferably, the shank is provided with an end-to-end axial passage communicating with the recess in the holder to receive a tool to facilitate removal of the cutting element carrying member which is press fitted in the holder recess and provided with an end socket in which a slug is positioned, mounting a diamond or other form of cutting or dressing element.

BACKGROUND OF THE INVENTION

Field of the invention

This invention relates to improvements in the construction of abrasive dressing tools of the type having a cutting element, such as a diamond, carried by a holder which is mounted for rotary movement about the longitudinal axis of a tool shank, thus enabling the holder to be rotated or indexed to equalize wear on the cutting element.

Description of the prior art

Several diamond dressing tools of the present type have been proposed in the prior art, examples being found in U.S. Patents 2,761,441, 2,845,922, and 2,999,493. All such prior tools with which I am familiar have been subject to various disadvantages, including one or more of the following: Failure in service due to the rotary holder binding or freezing on the shank caused by dirt, grit or corrosion; failure in service due to excessive wear between the rotary holder and the tool shank which causes the holder and hence the cutting element supported thereby to lose the extreme degree of rigidity required for precise dressing operations; excessive tool costs because of the inability to replace a worn cutting element, making it necessary to replace the entire tool and, high manufacturing cost of the complete tool assembly.

The improved construction of the present invention permits all of the foregoing problems and disadvantages to be either overcome or materially reduced.

SUMMARY OF THE INVENTION

The dressing tool of the invention, having a shank and a holder for a cutting element such as a diamond rotatably mounted on the shank, includes a portion of reduced diameter provided at one end of the shank forming a stub shaft extending longitudinally and a shoulder extending radially of the shank. The holder is formed with an axially extending recess and with a circular opening dimensioned for rotatable engagement with the stub shaft extending through the end wall of the holder into the recess, the recess having a larger transverse dimension than the diameter of the opening to form a radial shoulder surrounding the opening. The holder is rotatably mounted on the stub shaft of the shank with the end wall of the holder abutting the radial shoulder of the shank by means which include a compression washer and a retainer mounted on the stub shaft within the holder recess, the compression washer abutting on the radial shoulder of the holder. Fastening means, preferably formed by a swaging operation on the end of the stub shaft, urges the retainer axially into engagement with the compression washer to form a rigid, frictionally resisted rotary mounting of the holder on the stub shaft at minimum manufacturing cost. All interengaging parts can easily be manufactured for relatively long trouble-free service life. The construction is completed by a cutting element carrier which is removably secured within the holder recess.

Other preferred features include an axial passage extending through the tool shank and communicating with the recess of the holder enabling a drift tool to be inserted in the passage to facilitate removal of the cutting element carrier from the holder for replacement of the cutting element. Such replacement is further facilitated by the fact that the cutting element carrier may comprise a metal member shaped for close fitting engagement in the holder recess, and formed with an end socket in which a slug carrying the diamond cutting element is mounted.

Other features and advantages of the construction will appear from the description to follow of the presently preferred embodiment disclosed in the accompanying drawings.

BRIEF DESCRIPTION OF THE DRAWING

The drawing comprises the following views.

DESCRIPTION OF THE PREFERRED EMBODIMENT

Figure 1:
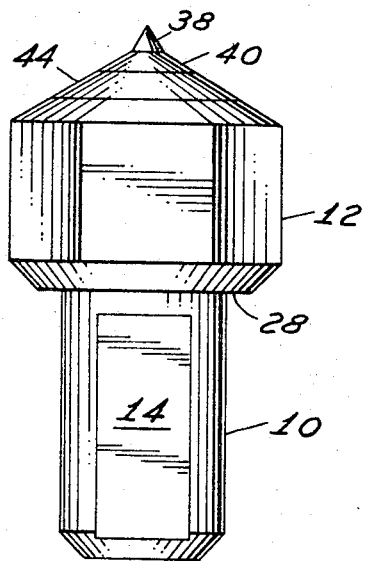
FIG. 1 is a side elevation of a tool constructed in accordance with the invention.
Figure 2:
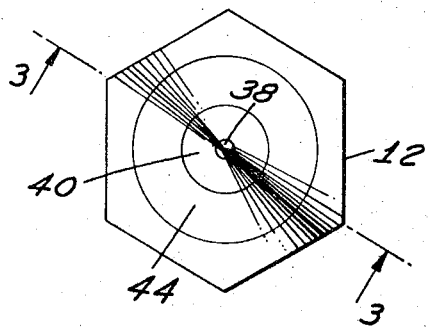
FIG. 2 is a plan view of the cutting end of the tool shown in FIG. 1.
Figure 3:
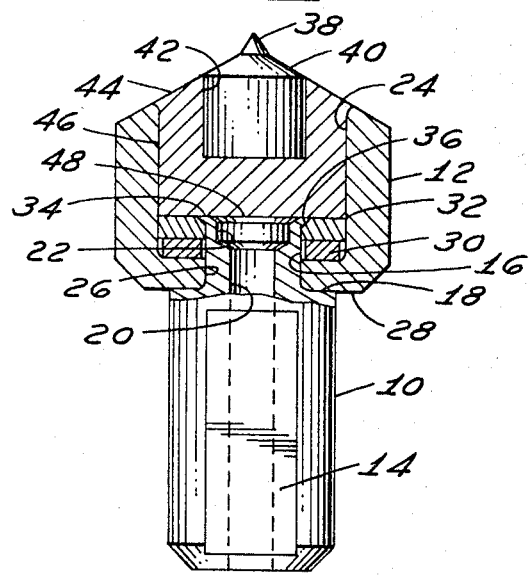
FIG. 3 is a sectional elevation taken as indicated by the line 3—3 of FIG. 2.

The tool construction illustrated includes a shank portion 10 and a holder 12. The shank 10 is cylindrical except for a flat surface 14 formed on one side thereof for mounting the shank in a dressing unit (not shown). At one end of the shank the diameter is reduced to form a longitudinally extending stub shaft portion 16 and a radially extending shoulder 18. A hole 20 is bored axially through the shank from end-to-end, and a counter-bored recess 22 is formed in the end of the stub shaft portion 16 of the shank.

The holder 12 has a hexagonal outer configuration and an axially extending recess 24 having a cylindrical wall form. A circular aperture 26 is formed in the end wall 28 of the holder, extending between the end wall and the recess and dimensioned for close fitting rotary engagement with the stub shaft 16.

Mounting of the holder 12 on the stub shaft 16 of the shank 10 is accomplished by means which include a compression washer 30 of the common split-ring type, and an annular retainer 32 dimensioned for close fitting rotatable engagement with the inner wall of the holder recess 24 and with the circumference of the stub shaft 16 of the shank. Fastening means, formed in the construction illustrated by a swaging of the annular end portion 34 of the stub shaft into engagement with a chamfered surface 36 on the retainer 32, urges the retainer axially into engagement with the compression washer and the end wall 28 of the holder into abutment with the shoulder 18 on the shank 10. While other fastening means may be employed, the form illustrated is preferred because of its simplicity and low cost and because of the firm rigid connection it provides in which rotary movement of the holder 12 on the shank 10 is permitted but yet is frictionally resisted so that the holder may be turned or indexed to any desired position of rotation. The swaging operation contributes to the desired rigidity in that it reduces any radial clearance between the stub shaft, retainer and holder.

A diamond cutting element 38 is mounted in a sintered slug 40 which in turn is positioned within a socket 42 formed in the end of a tool carrier member 44 having a cylindrical side wall 46 adapted to be secured, as by a press fit, within the recess 24 of the holder. While a single diamond is employed for the cutting or dressing element in the construction illustrated, other cutting or abrasive dressing materials can obviously be substituted, and the term "cutting element" as used herein is intended to include any cutting or abrasive element or elements which could be mounted on the holder 12. Preferably, the tool carrier 44 is pressed into the recess until the inner end 48 thereof bottoms on the end of the shank 10 and on the surface of the retainer 32 so that the tool carrier may contribute in preventing a loss of rigidity in the mounting of the holder on the shank in service.

The construction permits all of the interengaging parts which are subject to relative movement when the holder is rotated on the shank to be hardened or made of wear-resistant materials including the end portion and walls of the aperture 26 of the holder, the stub shaft 16, the compression washer 30 and the retainer 32. These parts are also designed so that when assembled, the washer 30 is compressed flat to not only provide the desired frictional resistance to rotation but also to contribute to the rigidity of the mounting of the holder 12 on the shank 10.

At such time as it becomes necessary in service to replace the cutting element 38, a drift tool (not shown) can be inserted in the axial bore 20 of the shank 10 to remove the tool carrier 44 from the recess 24 of the holder. The cutting element carrying slug 40 can be removed from the tool carrier and replaced by one equipped with a new cutting element, and the tool carrier 44 replaced in the holder. This replacement operation of the tool carrier 44, if performed with the holder 12 held against movement, will not impair the rigidity of the rotary joint between the holder and shank.

While a preferred embodiment has been described above in detail, it will be understood that numerous modifications might be resorted to without departing from the scope of the invention as defined in the following claims.

I claim:
1. In a dressing tool having a shank and a holder for a cutting element rotatably mounted on the shank, the improvement comprising:
   a portion of reduced diameter provided at one end of the shank forming a stub shaft extending longitudinally and a shoulder extending radially of the shank;
   the holder being provided with an axially extending recess and with a circular opening dimensioned for rotatable engagement with the stub shaft extending from the inner end of the recess through the end wall of the holder, the diameter of the opening being less than the transverse dimension of the recess to form a radial shoulder surrounding the opening;
   means rotatably mounting the holder on the stub shaft of the shank with the end wall of the holder abutting the radial shoulder of the shank including a compression washer and a retainer mounted on the stub shaft within the recess of the holder, the compression washer abutting on the radial shoulder of the holder, and fastening means on the stub shaft urging the retainer axially into engagement with the compression washer; and
   a cutting element carrier secured within the recess of the holder.

2. A dressing tool as claimed in claim 1 wherein the fastening means comprises an axial recess formed in the end of the stub shaft enabling the stub shaft to be swaged outwardly into engagement with the retainer.

3. A dressing tool as claimed in claim 2 further comprising an axial passage extending through the shank and communicating with the recess of the holder whereby a tool may be inserted in said axial passage for removing the cutting element carrier from the holder.

4. A dressing tool as claimed in claim 3 wherein the cutting element carrier comprises a member having an outer side wall portion shaped for close fitting engagement with the holder recess, an end socket, and a cutting element mounting slug positioned within the socket.

5. A dressing tool as claimed in claim 1 further comprising means for facilitating removal of the cutting element carrier from the holder.

6. A dressing tool as claimed in claim 5 wherein the cutting element carrier comprises a member having an end socket, an outer side wall portion shaped for close fitting engagement with the holder recess, and a cutting element mounting slug positioned within the end socket.

7. A dressing tool as claimed in claim 6 wherein the means for facilitating removal of the cutting element includes an axial passage extending through the shank and communicating with the holder recess.

8. A dressing tool as claimed in claim 1 further comprising a passage extending axially through the shank between the ends thereof and communicating with the recess in the holder.

References Cited

UNITED STATES PATENTS

| 2,577,042 | 12/1951 | Speicher. | |
| 2,761,441 | 9/1956 | Loecy | 125—39 |
| 2,845,922 | 8/1958 | Kuhlstrunk | 125—39 |
| 2,999,493 | 9/1961 | Blair | 125—39 |

HAROLD D. WHITEHEAD, *Primary Examiner.*

U.S. Cl. X.R.

125—11